United States Patent
Eickhoff et al.

(10) Patent No.: US 8,469,444 B2
(45) Date of Patent: Jun. 25, 2013

(54) DRESSED HEADLINER FOR VEHICLES WITH A FINISHED PERIMETER AND A METHOD FOR OBTAINING IT

(75) Inventors: Thomas Eickhoff, Rochester Hills, MI (US); Miguel Angel Grande Collado, Burgos (ES)

(73) Assignee: Grupo Antolin Ingenieria, S.A. (ES)

( * ) Notice: Subject to any disclaimer, the term of this patent is extended or adjusted under 35 U.S.C. 154(b) by 191 days.

(21) Appl. No.: 13/008,345

(22) Filed: Jan. 18, 2011

(65) Prior Publication Data

US 2012/0161478 A1   Jun. 28, 2012

(30) Foreign Application Priority Data

Dec. 27, 2010   (EP) .................................... 10382356

(51) Int. Cl.
  *B60R 13/02* (2006.01)

(52) U.S. Cl.
  USPC .......................... 296/214; 296/39.3

(58) Field of Classification Search
  USPC ................... 296/39.3, 214
  See application file for complete search history.

(56) References Cited

U.S. PATENT DOCUMENTS

| | | | | |
|---|---|---|---|---|
| 4,600,621 | A * | 7/1986 | Maurer et al. | 428/121 |
| 5,275,865 | A * | 1/1994 | Nicolay | 428/174 |
| 6,161,895 | A * | 12/2000 | Jaeckle et al. | 296/214 |
| 7,874,832 | B2 * | 1/2011 | Kujawa | 425/394 |
| 2004/0239152 | A1 * | 12/2004 | Luik et al. | 296/214 |
| 2005/0231006 | A1 * | 10/2005 | Pfeffer et al. | 296/214 |
| 2011/0133522 | A1 * | 6/2011 | Kring et al. | 296/214 |
| 2011/0274921 | A1 * | 11/2011 | Li et al. | 428/354 |

* cited by examiner

*Primary Examiner* — Jason S Morrow
(74) *Attorney, Agent, or Firm* — Banner & Witcoff, Ltd.

(57) ABSTRACT

A dressed headliner for vehicles with a finished perimeter, where the headliner's finished perimeter is formed without the addition of any adhesive and where the finished perimeter is a high quality finished perimeter with sharp contour.

2 Claims, 3 Drawing Sheets

DRESSED HEADLINER FOR VEHICLES WITH A FINISHED PERIMETER AND A METHOD FOR OBTAINING IT

TECHNICAL FIELD

The current invention relates to a dressed headliner for vehicles with a finished perimeter and a method for obtaining it method, without the addition of any adhesive or joining means.

More particularly this finishing is suitable for dressed vehicle headliners consisting in a laminate which comprises a thermoset self-supporting layer which lightness, acoustic performance, mechanical performance and heat sag behavior are better than the other known competing headliner technologies.

The process for getting this finished perimeter is chosen from those methods that use heat and pressure only, avoiding the addition of any adhesive or joining means to the original headliner.

PROBLEM TO BE SOLVED

Global automotive markets increasingly demand vehicles with higher standards, much better interior perceived quality, with smooth continuous flow surface and less "plastic" look determining the design of the headliner.

Additionally to this, more and more different options of a variety of roof styles, like panoramic large glass opening roofs, are offered to and demanded by end-users.

In the case of the roof interior responding this quality demand implies the use of dressed headliners, paying special attention to geometry, sharp shaping and to quality of the finishing of the perimeter, at least in the near surroundings visible or accessible to the vehicle passengers.

The achievement of such high quality finish at the perimeter of the vehicle headliner is especially critical when this headliner is used in combination with transparent roofs, panoramic windshields or sun-roofs, where at least some parts of the perimeter of the vehicle headliner are easily visible and accessible to passengers.

In addition, this demanded perceived quality must be compatible with those manufacturing technologies which are suitable for light, low heat sag, high mechanical and acoustic performance headliners, but using a cheap, simple method using only heat and pressure, avoiding the addition of adhesives or any other joining mean.

A finished perimeter means a sharply defined fully dressed edge, that is a high-quality finished perimeter of a headliner requires sharp headliner contour, uniformly covered by the dressing layer and avoiding the increment of the thickness of the headliner at its perimeter.

BACKGROUND OF THE INVENTION

There are two main types of methods for manufacturing dressed thermoset-based headliners: two-step manufacturing methods and one-step manufacturing methods.

In the case of so called two-step manufacturing methods, the first step is for press thermo-forming the headliner substrate and the second step is for dressing up the headliner with a dressing layer.

In the case of one-step manufacturing methods, shaping and dressing of the headliner occurs at the same time by simultaneously press thermo-forming of all headliner layers, including the dressing layer.

The complexity and the costs of two step methods are higher than for one-step methods, but on the other side the complexity of the finished perimeter of dressed headliners strongly depend on the manufacturing method for the whole dressed headliner.

The finishing of the perimeter of a two-step manufacturing process of a thermoset headliner is relatively easy considering that the sharpness of the perimeter is achieved in the first substrate shaping step, and the final wrapping of the perimeter is easily achieved at the end of the second step of dressing of the headliner. U.S. Pat. No. 4,986,865 and U.S. Pat. No. 7,147,276, disclose substantially known methods according to that described above.

On the other hand, in the case of one-step manufacturing headliner method, there are two options.

The less complex one can be carried out by simply cutting out the headliner once it has been shaped and dressed without any other further operation, that is, without wrapping its perimeter. This simple method is compatible with any headliner manufacturing technology but it renders a low finishing quality of the headliner perimeter.

Second option allows a high quality finishing of the perimeter but it is much more complex considering that it should be carried out once the headliner is shaped and fully dressed.

That means that for a high quality finishing of the perimeter of a one-step thermoset headliner requires adhesive addition making difficult to control such finishing method.

Additionally the use of additional adhesives can damage the headliner, specially the dressing layer, e.g. due to possible adhesive leaks when adhesive addition stain the dressed headliner or dirty the headliner or the tools. U.S. Pat. No. 6,161,895 discloses a substantially known method according to that described above.

It is also known an intermediate case for finishing the perimeter of the one-step manufactured headliners. In order to finish the perimeter of the headliner, it is necessary to carry out a cutting step of a strip of the headliner, in particular, a strip of substrate of the headliner, leaving an excess of the dressing layer to wrap the perimeter of the headliner. In order to remove the strip of substrate, water steam can be applied on it. European patents EP1627720, EP1518663 disclose substantially known methods according to that described above.

Therefore, in order to overcome the drawbacks of the state of the art, the main objective of the invention is to achieve a dressed headliner for vehicles with a high quality finished perimeter without using additional materials to form this finished perimeter.

DESCRIPTION OF THE INVENTION

In view of the above described, the invention refers to a headliner for vehicles with a finished perimeter which comprises:

a shaped laminate body comprising the following layers:
a first dressing layer,
a second thermoset self-supporting layer and,
a third thermoplastic back layer,
wherein said second self-supporting layer is placed between said first dressing layer and said third back layer,
wherein said shaped laminate body is formed by the simultaneously shaping of said layers,
wherein said shaped laminate body comprises in turn a main body and at least a hem,
the at least one hem placed just beside the main body and along at least a part of the perimeter of the headliner is divided into two parts by a folding line "s":

A first part of the hem formed by a folded excess of material of the headliner along the folding line "s", A second part of the hem formed by an adjacent part to the first part which is placed between the first part and the main body, wherein first part is on the second part and in contact with it, and both parts, first and second parts, are joined by the third thermoplastic back layer, in such a way additional connecting means are not used, and wherein the first part of the hem is compressed in such a way that the thickness of first part is less than half the thickness of the second part defining a finished perimeter.

Additionally, the present invention also refers to a method for obtaining a headliner with a high quality finished perimeter with the features above described.

Due to the configuration of the invention it is possible to obtain a headliner whose perimeter will be subsequently finished, by forming the headliner in an only one step, in this way the cycle for obtaining the headliner is strongly reduced due to the steps to form the substrate (self supporting layer plus back layer) and to dress said substrate (with dressing layer), are carry out simultaneously with the same tooling.

Therefore, the necessary steps for obtaining the headliner are reduced and consequently the cost of the method is also reduced with the consequent economic savings in terms of reducing manufacturing cycle times and the space occupied in the installation for manufacturing the headliner.

On the other hand, the fact of using the third thermoplastic back layer of the headliner as adhesive in order to form headliner's finished perimeter, allows reducing the cost of the headliner and the number of different materials to manage in the method for manufacturing it because of additional attaching means are avoided.

Additionally, the configuration of the invention improves the appearance of the finished perimeter of the headliner due to the reduction of the thickness of the excess of material which forms part of the finished perimeter because this thickness is directly related with the sharpness of the resulting finished perimeter, improving the appearance of the finished headliner perceived from the interior of the vehicle.

BRIEF DESCRIPTION OF THE DRAWINGS

This descriptive report is supplemented by a set of drawings, illustrative and never limitative, of the preferred example of the invention.

DETAILED DESCRIPTION OF THE PREFERRED EMBODIMENT

Figure 1:
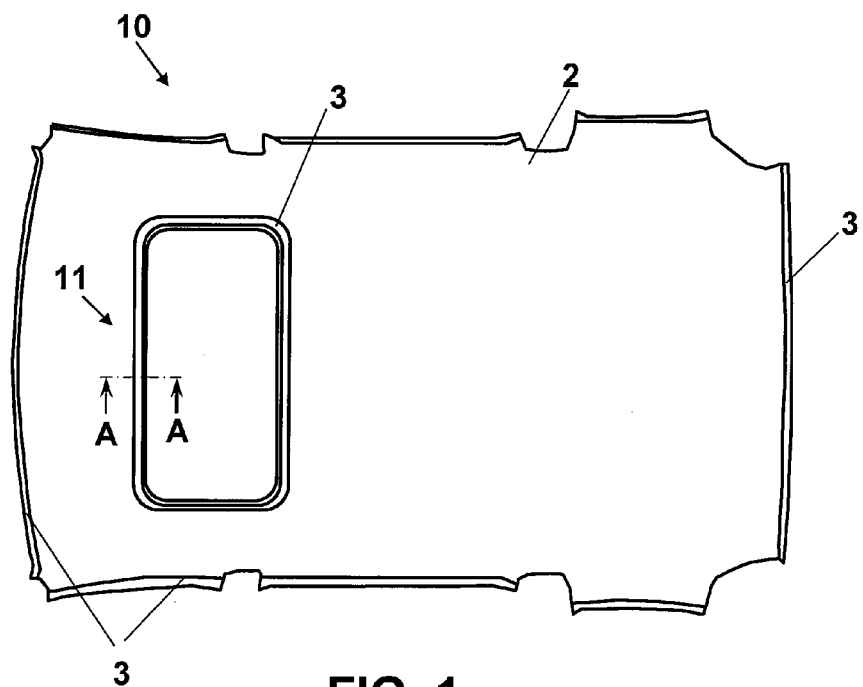
FIG. 1 shows a view in plant of a headliner with a finished perimeter.

As it can be seen in FIG. 1, a headliner (10) is constituted by a shaped laminate body (1) which in turn is formed by a main body (2) and at least one hem (3).

Headliner (10) is provided with a hem (3) with the objective of improving its aesthetic appearance.

The shaped laminate body (1) is constituted by next superimposed layers:

A first dressing layer (1.1), for example a decorative textile layer.

A second thermoset self-supporting layer (1.2) which it can be constituted by an only layer, or by the combination of more than one layers. As for example a reinforcing layer (not represented) connected to a thermoset foam layer (1.2) by a thermoset adhesive (not represented).

Thermoset self-supporting layer (1.2) does not mean that all the layers which form it have to be necessarily thermoset materials, it is enough if one of them it is a thermoset material.

A third thermoplastic back layer (1.3) which protects the second thermoset self supporting layer (1.2) and prevents adhesive leaking avoiding dirtiness on tool or on the headliner (10).

Second thermoset self-supporting layer (1.2) is placed between said first dressing layer (1.1) and said third thermoplastic back layer (1.3), in such a way that by one hand it is protected by the third thermoplastic back layer (1.3), and by the other hand it is concealed by the first dressing layer (1.1) visible from the vehicle interior.

On the other hand, shaped laminate body (1) is formed by the simultaneously shaping of said layers (1.1, 1.2, 1.3).

As it has been said above, shaped laminate body (1) comprises in turn a main body (2) and at least a hem (3).

On the one hand, hems (3) are the parts of the shaped laminate body (1) placed in some ends of the main body (2) in order to improve the appearance of the headliner (10).

Particularly hems (3) are placed in some areas along the perimeter of the main body (2), for example in correspondence with the external perimeter of the headliner (10) and/or in correspondence with the perimeter which defines the sunroof opening (11) as can be appreciated in FIG. 1.

On the other hand, main body (2) is the part of the shaped laminate body (1) which does not correspond to a hem (3).

Figure 2:
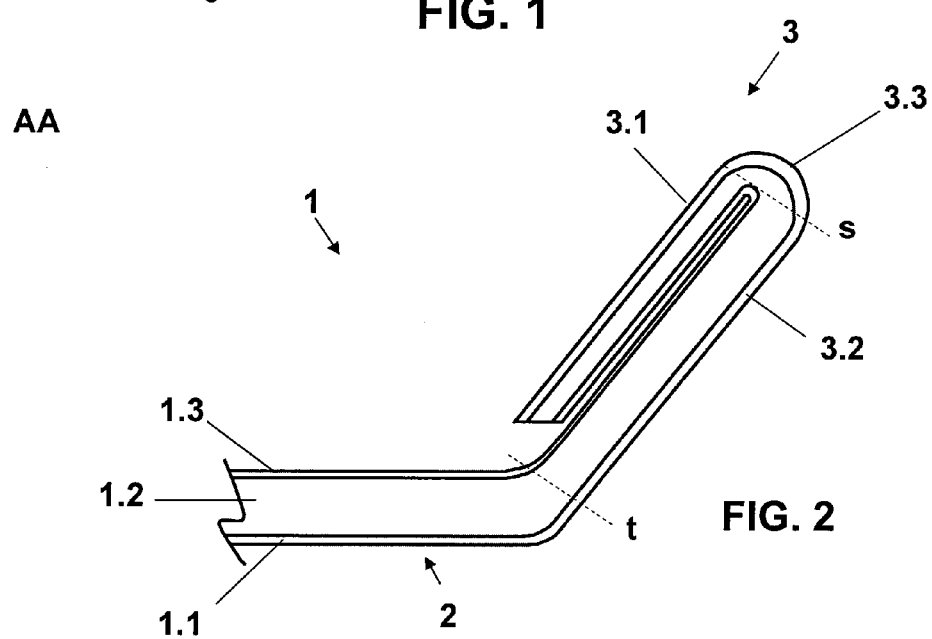
FIG. 2 shows a schematic view of the section AA corresponding to the finished perimeter of the sunroof of the headliner wherein different layers and parts which constitute said finished perimeter are shown.

FIG. 2 shows a section of one of the hem (3), particularly the one corresponding to sunroof opening.

Hems (3) are constituted by the same layers (1.1, 1.2, 1.3) as ones constitute the shaped laminate body (1) and as a continuation of the main body (2). That is, neither additionally materials as for example, adhesives or another attaching means, are used in order to obtain hems (3), nor any layer is subjected to a cutting step.

As it can be appreciated in FIG. 2, hem (3) is divided into two parts by a folding line represented in FIG. 2 by a dotted line "s":

A first part (3.1) of the hem (3) formed by a folded excess of material of the headliner (10), A second part (3.2) of the hem (3) formed by an adjacent part to the first part (3.1) which is placed between the first part (3.1) and the main body (2). Second part (3.2) and main body (2) are separated by dotted line "t" as FIG. 2 shows.

As shows FIG. 2, first part (3.1) is placed in contact with the second part (3.2).

In order to keep both part fixed together, first and second parts (3.1, 3.2), are joined by mean of the third thermoplastic back layer (1.3), in such a way that additional joining means are not used.

It is possible because of the thermoplastic composition of the third thermoplastic back layer (1.3), therefore by heating this layer (1.3), it can be used as connecting means in order to fix first part (3.1) of the hem (3) to the second part (3.2) of the hem (3) in order to form the hem (3).

Figure 4:
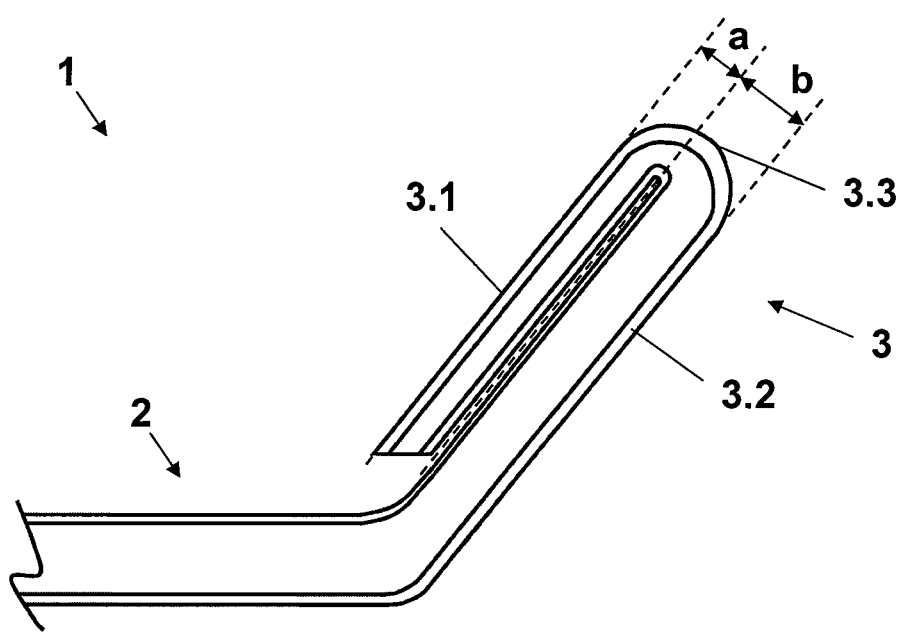
FIG. 4 shows a schematic view in section of the finished perimeter wherein the thickness of first part and second part of the hem are identified.

On the other hand and as can be appreciated in FIG. 4, thickness "a" of first part (3.1) is less than the thickness "b" of second part (3.2) of the hem (3), particularly the thickness "a" of the first part (3.1) is less than half the thickness "b" of the second part (3.2), due to an compression of the first part (3.1) which is preceded by a softening due to previous local heating of said first part (3.1).

The different thicknesses "a" and "b" of the first part (3.1) and the second part (3.2) of the hem (3) is directly related with the sharpness of the resulting finished perimeter (3.3), improving the appearance of the finished headliner (10) perceived from the interior of the vehicle.

Figure 3:
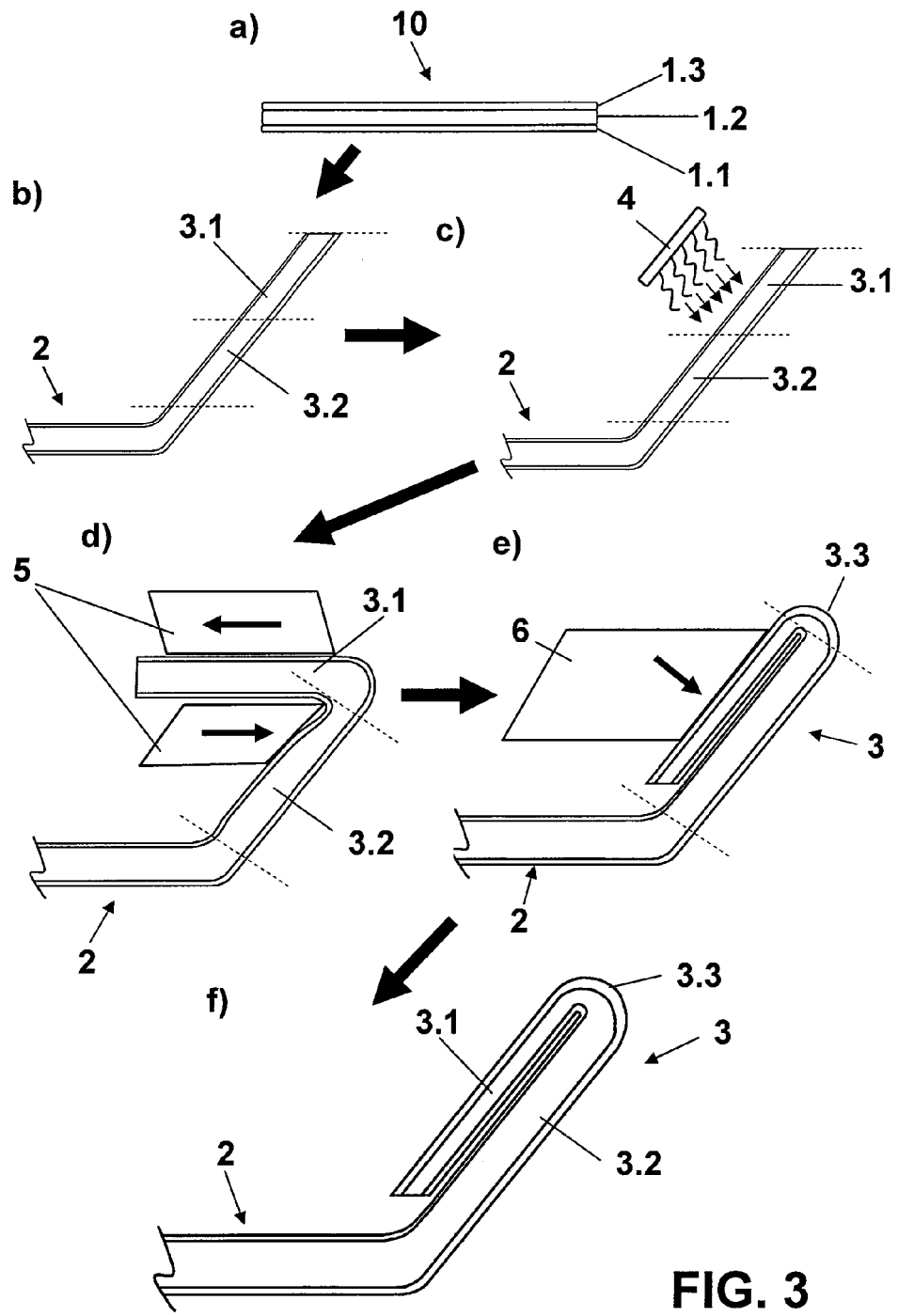
FIG. 3 shows a schematic diagram of different steps of the method for obtaining the headliner with a finished perimeter.

Once physical configuration of the headliner (10) with finished perimeter (3.3) has been described, the method for obtaining this headliner (10) with a finished perimeter (3.3) which is shown in FIG. 3 is explained in detail below.

The method for obtaining the headliner with a finished perimeter of the invention comprises the next steps:

a) Providing a headliner (10) which comprises:
a shaped laminate body (1) comprising the next superimposed layers:
  A first dressing layer (1.1), for example a decorative textile layer.
  A second thermoset self-supporting layer (1.2) which it can be constituted by one only layer, or by the combination of more than one layer. As for example a reinforcing layer (not represented) connected to a thermoset foam layer (1.2) by a thermoset adhesive (not represented).
  Thermoset self-supporting layer (1.2) does not mean that all the layers which form it have to be necessarily thermoset materials, it is enough if one of them it is a thermoset material.
  A third thermoplastic back layer (1.3) which protects the second self supporting layer and prevents adhesive leaking avoiding the mold and the headliner to get dirty.

Although the previous method for obtaining a headliner (10) is not object of the invention, it has been considered to make a brief description of this method because it determinates the way to obtain the hems (3) with a finished perimeter (3.3) of the headliner (10).

In order to manufacture the headliner (10), above described layers of the shaped laminate body (1) of the headliner (10), are introduced in a mold (not represented) in such a way that second thermoset self-supporting layer (1.2) is placed between first dressing layer (1.1) and third thermoplastic back layer (1.3).

These layers (1.1, 1.2, 1.3) are simultaneously press-formed to the final shape of the headliner.

Headliner (10) in this way obtained is the starting point of the method for the invention and the configuration of the headliner (10).

Second step b) of the method comprises the step of cutting out the scrap of the shaped laminate body (1), leaving at least an excess of material which corresponds to a first part (3.1) of the hem (3) of the headliner (10) along at least a part of the perimeter of said shaped laminate body (1) which is going to be folded in order to form a hem (3) placed as continuation of a main body (2) where both, main body (2) and hem (3) are part of the headliner (10), Next, step c) which comprises the locally heating of the excess of material which corresponds to the first part (3.1) of the hem (3) causes that the part of the second self-supporting layer (1.2) corresponding to the excess of material reaches a softened state and a part of the third thermoplastic back layer (1.3) corresponding to the excess of material reaches a melted state.

Following, a folding step d) of the excess of material is carried out along a folding line "s" forming the hem (3), such line "s" dividing the hem (3) into two parts, the first part (3.1) and a second part (3.2) adjacent to the first part (3.1) and placed between main body (2) and the first part of the hem (3), Once folding step d) has finished, Pressing step e) of the hem (3), where it is carry out the flattening and squashing of the softened first part (3.1) against the second part (3.2), in such a way the first part (3.1) is joined to the second part (3.2) by action of the melted part of the third thermoplastic layer (1.3) corresponding to the first part (3.1).

In this step the thickness of the first part (3.1) is reduced regarding the thickness of second part (3.2).

Particularly and it can be appreciated in FIG. 4, the thickness "a" of the first part (3.1) is less than half the thickness "b" of the second part (3.2), due to a compression of the first part (3.1) which is preceded by a local heating of said first part (3.1).

It is very important to localize the application of heat strictly only to the excess of material (first part (3.1)) in order to achieve the desired appearance. This local heating makes possible to reduce only the thickness "a" of first part (3.1).

The different thicknesses "a" and "b" of the first part (3.1) and the second part (3.2) of the hem (3) is directly related with the sharpness of the resulting finished perimeter (3.3) improving the appearance of the finished headliner (10) perceived from the interior of the vehicle.

Finally, a cooling step f) of the first part (3.2) of the hem (3) is carried out in order to obtain the finished perimeter (3.3) of the headliner (10) formed by the hem (3) and the main body (2).

The invention claimed is:

1. Headliner for vehicles with a finished perimeter which comprises:
  a shaped laminate body (1) comprising the following layers:
    a first dressing layer (1.1),
    a second thermoset self-supporting layer (1.2) and
    a third thermoplastic back layer (1.3),
  wherein said second self-supporting layer (1.2) is placed between said first dressing layer (1.1) and said third back layer (1.3),
  wherein said shaped laminate body (1) is formed by the simultaneously shaping of said layers,
  wherein said shaped laminate body (1) comprises in turn a main body (2) and at least a hem (3),
  the at least one hem (3) placed just beside the main body (2) and along at least a part of the perimeter of the headliner (10) is divided into two parts by a folding line "s":
    a first part (3.1) of the hem (3) formed by a folded excess of material of the headliner (10) along the folding line "s",
    a second part (3.2) of the hem (3) formed by an adjacent part to the first part (3.1) which is placed between the first part (3.1) and the main body (2),
  wherein first part (3.1) is on the second part (3.2) and in contact with it, and both parts (3.1, 3.2), first and second parts, are joined by the third thermoplastic back layer (1.3), in such a way additional connecting means are not used,
  and wherein the first part (3.1) of the hem (3) is compressed in such a way that the thickness of first part (3.1) is less than half the thickness of the second part (3.2) defining a finished perimeter (3.3).

2. Headliner for vehicles with a finished perimeter according to claim 1 characterized in second thermoset self-supporting layer (1.2) comprises a laminate formed by a fiber reinforcing layer and a thermoset foam layer where the fiber reinforcing layer are connecting by a thermoset adhesive.

* * * * *